United States Patent
Stanley et al.

(10) Patent No.: US 8,955,886 B2
(45) Date of Patent: Feb. 17, 2015

(54) HYDRAULIC DUCTS AND CONNECTING ASSEMBLIES

(75) Inventors: Randy Stanley, Ocala, FL (US); Terence Skiba, Ocala, FL (US)

(73) Assignee: Yokohama Industries Americas Inc., Versailles, KY (US)

( * ) Notice: Subject to any disclaimer, the term of this patent is extended or adjusted under 35 U.S.C. 154(b) by 199 days.

(21) Appl. No.: 12/962,718

(22) Filed: Dec. 8, 2010

(65) Prior Publication Data

US 2012/0146325 A1    Jun. 14, 2012

(51) Int. Cl.
F16L 33/207    (2006.01)
B23P 11/00    (2006.01)

(52) U.S. Cl.
CPC ............ B23P 11/005 (2013.01); F16L 33/2073 (2013.01)
USPC .......................................... 285/259; 285/256

(58) Field of Classification Search
USPC ............................... 285/242, 256, 259; 29/508
See application file for complete search history.

(56) References Cited

U.S. PATENT DOCUMENTS

| | | | |
|---|---|---|---|
| 784,372 A * | 3/1905 | Albee | 285/243 |
| 2,198,996 A * | 4/1940 | Guarnaschelli | 285/254 |
| 2,228,018 A | 1/1941 | Scholtes | |
| 2,685,458 A | 8/1954 | Shaw | |
| 3,246,921 A * | 4/1966 | Lyon et al. | 285/247 |
| 3,347,571 A * | 10/1967 | New | 285/222.4 |
| 3,951,438 A * | 4/1976 | Scales | 285/55 |
| 4,330,142 A | 5/1982 | Paini | |
| 4,657,285 A | 4/1987 | Akiyama et al. | |
| 4,671,542 A | 6/1987 | Juchnowski | |
| 4,684,157 A | 8/1987 | Smith | |
| 4,754,994 A * | 7/1988 | Melzer et al. | 285/259 |
| 5,137,309 A | 8/1992 | Beagle | |
| 5,358,012 A * | 10/1994 | Kish | 138/109 |
| 5,553,896 A | 9/1996 | Woodward | |
| 5,662,394 A | 9/1997 | Choi | |
| 6,773,038 B2 | 8/2004 | Villano et al. | |

FOREIGN PATENT DOCUMENTS

| | | | |
|---|---|---|---|
| DE | 9104415 | 10/1991 | |
| DE | 9411779 | 12/1994 | |
| EP | 1122484 | 8/2001 | |
| FR | 2594205 | 8/1987 | |
| JP | 2300594 | 12/1990 | |
| JP | 04337187 A * | 11/1992 | ............ F16L 33/20 |

\* cited by examiner

*Primary Examiner* — James Hewitt
(74) *Attorney, Agent, or Firm* — Dinsmore & Shohl LLP

(57) ABSTRACT

A hydraulic duct for feeding fluid at high pressure includes a rigid tube and a flexible hose connected to the rigid tube by a connecting assembly. The connecting assembly includes an endform in communication with the rigid tube over which the flexible hose extends. The endform includes a primary annular projection extending outwardly from a periphery of the endform and at least one auxiliary annular projection extending outwardly from the periphery of the endform. The primary annular projection includes a leading edge, a trailing edge, a landing region that extends axially from the trailing edge toward the leading edge and a stop bead that extends outwardly from the leading edge beyond the landing region.

6 Claims, 3 Drawing Sheets

HYDRAULIC DUCTS AND CONNECTING ASSEMBLIES

TECHNICAL FIELD

The present specification generally relates to hydraulic ducts and connecting assemblies therefore.

BACKGROUND

In the automotive industry, fuel efficiency is a concern. Automakers continue to search for methods and systems to conserve fuel and reduce engine drag. One of the methods to reduce engine drag is to provide power steering pumps having increased efficiency and that run at higher pressures. By increasing the pressures, there is a need for high pressure hose connections.

To this end, tubular connectors may be used that are affixed to metal tubes that are provided with one or more projections onto which a flexible tube is fitted. A clamping element may be used to clamp the flexible tube to the tubular connectors.

SUMMARY

In one embodiment, a hydraulic duct for feeding fluid at high pressure includes a rigid tube and a flexible hose connected to the rigid tube by a connecting assembly. The connecting assembly includes an endform in communication with the rigid tube over which the flexible hose extends. The endform includes a primary annular projection extending outwardly from a periphery of the endform and at least one auxiliary annular projection extending outwardly from the periphery of the endform. The primary annular projection includes a leading edge, a trailing edge, a flat landing region that extends axially from the trailing edge toward the leading edge and a stop bead that extends outwardly from the leading edge beyond the landing region. A clamping component is compressed over the flexible hose. The clamping component includes a shell portion that extends in a direction generally along a length of the endform and a base portion extending inwardly from the shell portion toward the endform having an inner rim that is engaged with the landing region of the primary annular projection at a location adjacent the stop bead.

In another embodiment, a method of assembling a hydraulic duct for feeding fluid at high pressure is provided. The method includes providing an endform that is in communication with a rigid tube. The endform includes a primary annular projection extending outwardly from a periphery of the endform and at least one auxiliary annular projection extending outwardly from the periphery of the endform. The primary annular projection includes a leading edge, a trailing edge, a flat landing region that extends axially from the trailing edge toward the leading edge and a stop bead that extends outwardly from the leading edge beyond the landing region. An end of a flexible hose is located over the endform. A clamping component is slid axially over the flexible hose until a leading edge of a base portion engages the stop bead such that an inner rim of the base portion is located over the landing region.

In another embodiment, a connecting assembly for connecting a rigid tube with a flexible hose for feeding fluid at high pressure is provided. The connecting assembly has an initial, uncompressed configuration and a compressed configuration when compressed about the endform with the flexible hose therebetween. The connecting assembly includes an endform capable of communicating with the rigid tube. The endform includes a primary annular projection extending outwardly from a periphery of the endform and at least one auxiliary annular projection extending outwardly from the periphery of the endform. The primary annular projection includes a leading edge, a trailing edge, a flat landing region that extends axially from the trailing edge toward the leading edge and a stop bead that extends outwardly from the leading edge beyond the landing region. A clamping component is configured to be compressed over the flexible hose. The clamping component includes a shell portion that extends generally axially and a base portion that extends inwardly from the shell portion having an inner rim, wherein, in the compressed configuration, the inner rim is engaged with the landing region of the primary annular projection at a location adjacent the stop bead.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to duct structures and connecting assemblies for connecting a flexible tube to a rigid tube. Such duct structures may be used, for example, to feed fluid under high pressure to a power-assisted steering installation.

Figure 1:
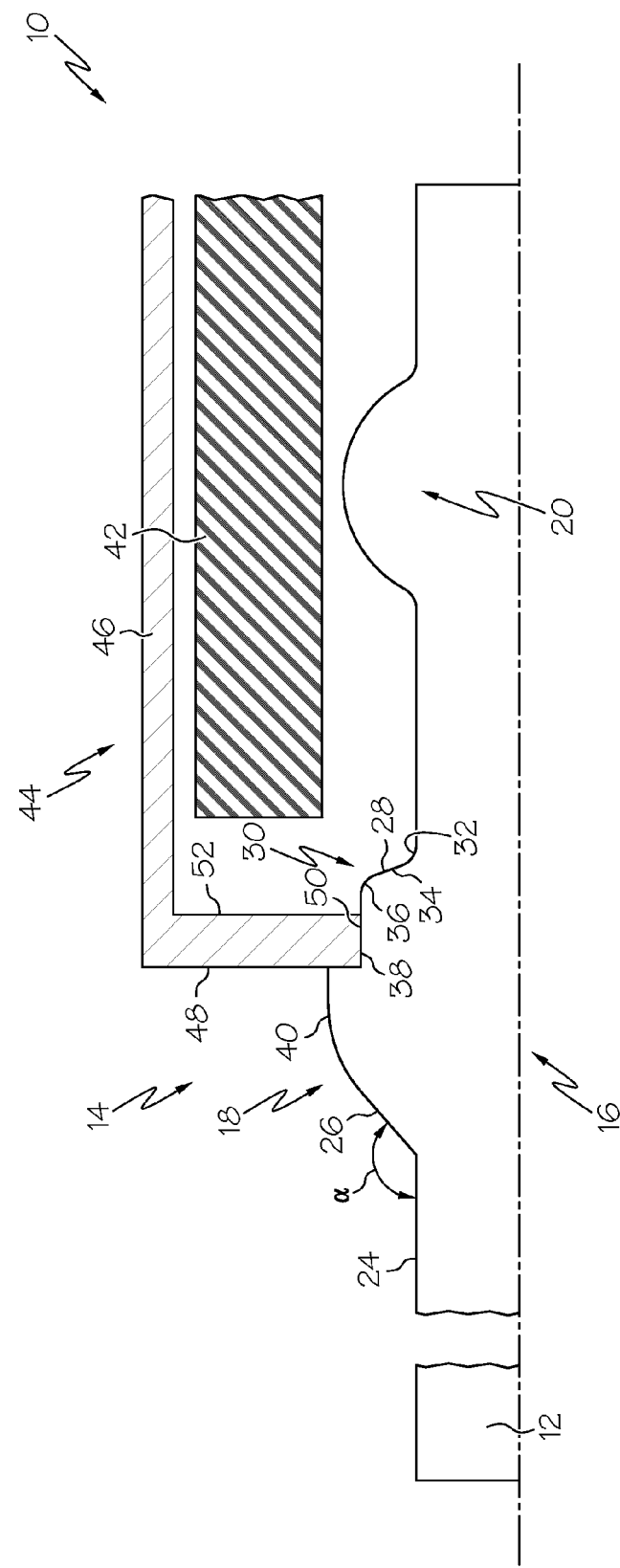
FIG. 1 is a section view of a duct structure in an uncompressed configuration according to one or more embodiments shown and described herein.

Referring to FIG. 1, a duct structure 10 is illustrated in an unconnected configuration and generally includes a rigid tube 12 (e.g., formed of metal such as steel) and a connecting assembly 14. The rigid tube 12 has an endform 16, which is part of the connecting assembly 14, that includes a primary annular projection 18 and at least one auxiliary annular projection 20. The primary annular projection 18 and the auxiliary annular projection 20 may extend about the entire outer periphery 24 of the endform 16. In some embodiments, the endform 16 may be formed by a separate component that is attached (e.g., welded) to the rigid tube 12. In other embodiments, the endform 16 is formed integrally with the rigid tube 12 (i.e., as part of the rigid tube 12).

The primary annular projection 18 extends integrally from the periphery 24 of the endform 16 and includes a leading edge 26 and a trailing edge 28. The leading edge 26 may extend outwardly from the periphery 24 at any suitable angle $\alpha$, such as at about or greater than 90 degrees. The trailing edge 28 has a somewhat S-shaped transition 30 having a curved inner diameter portion 32, a vertical or substantially straight portion 34 and a curved outer diameter portion 36 that leads to a landing region 38. The landing region 38 is located between a stop bead 40 and the outer diameter portion 36 and is somewhat planar and/or flat. In other embodiments, the landing region 38 may have a shape that is other than planar and/or flat. As clearly depicted in FIGS. 1 and 2, the landing region 38 is positioned outwardly distal in a radial direction from the substantially straight portion 34 of the trailing edge 28. The stop bead 40 extends outwardly from the leading edge 26, extending outwardly beyond the landing region 38.

A flexible hose 42 is fitted over the endform 16. The flexible hose 42 may be formed of one or more layers of flexible material, such as rubber, plastic or a combination of materials.

The connecting assembly 14 includes a clamping component 44 that is used to clamp the flexible hose 42 to the endform 16. The clamping component 44 includes a shell portion 46 that extends generally in a direction along a length of the endform 16 and a base portion 48 that extends radially inwardly toward the endform 16. An inner rim 50 defines an opening having a diameter that is greater than a diameter of the landing region 38, yet smaller than the maximum diameter of the stop bead 40. The shell portion 46 is sized to be positioned around an outer perimeter of the endform 16 and the flexible hose 42 with the inner rim 50 of the base portion 48 adjacent the landing region 38. In the illustrated position, the base portion 48 abuts the stop bead 40 to inhibit further axial movement of the clamping component 44 relative to the endform 16. The stop bead 40 can be used to position the base portion 48 above the landing region 38. The base portion 48 and the inner rim 50 have a thickness that is less than a length of the landing region 38 such that when the base portion 48 abuts the stop bead 40, a trailing edge 52 of the base portion 48 is spaced from the curved outer diameter portion 36 of the S-shaped transition 30.

Figure 2:
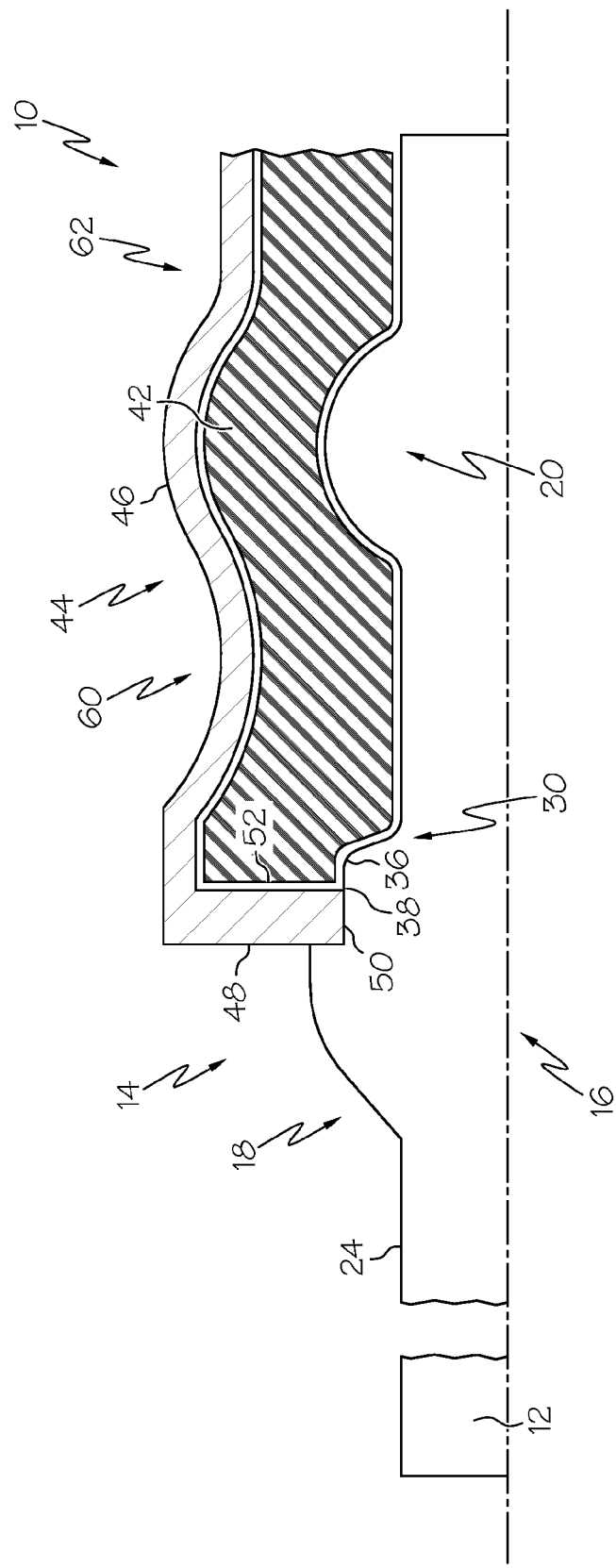
FIG. 2 is a section view of the duct structure of FIG. 1 in a compressed configuration according to one or more embodiments shown and described herein.

Referring to FIG. 2, the clamping component 44 may be plastically deformed (e.g., crimped) over the flexible hose 42 and the endform 16 so as to cause compression of the flexible hose 42, which inhibits removal of the flexible hose 42 from the endform 16 and provides a fluid-tight seal between the flexible hose 42 and the endform 16. As clearly depicted in FIG. 2, in embodiments, the flexible hose 42 terminates at a termination location on the landing region 38 that is axially positioned between the inner rim 50 and the trailing edge 28 of the primary annular projection 18, such that the flexible hose 42 at the termination location is located no further inwardly distal than an end face of the inner rim 50. The compression of the clamping component 44 also reduces the diameter of the base portion 48 and inner rim 50, which can cause the inner rim 50 to bite or seat flat into the landing region 38 at a location spaced from the curved outer diameter portion 36 of the S-shaped transition 30. No portion of the flexible hose 42 may be located between the inner rim 50 and the landing region 38.

As can be seen by FIG. 2, compressing the clamping component 44 radially causes regions 60 and 62 adjacent the auxiliary annular projection 20 to swage down in diameter thereby compressing the flexible hose 42 between the endform 16 and the shell portion 46 of the clamping component 44. The engagement between the base portion 48 and the landing region 38 of the primary annular projection 18 prevents axial movement of the flexible hose 42 beyond the trailing edge 52 of the base portion 48 as shown.

Figure 3:
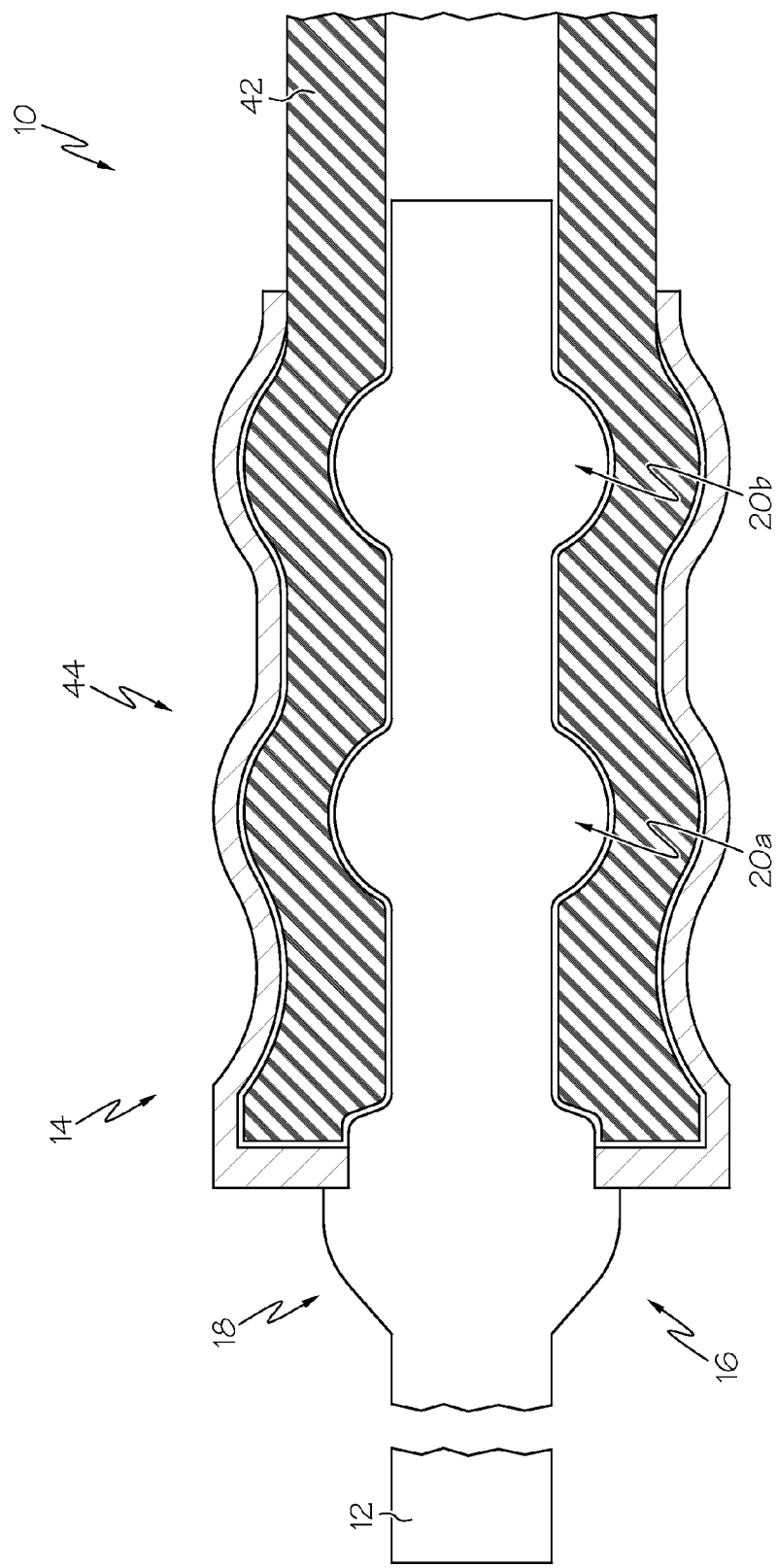
FIG. 3 is a section view of a duct structure in a compressed configuration according to one or more embodiments shown and described herein.

Referring now to FIG. 3, the exemplary duct structure 10 is shown including the rigid tube 12, the flexible hose 42 and the connecting assembly 14. In the illustrated embodiment, the endform 16 is connected to the rigid tube 12, for example, by welding. The endform 16 includes the primary annular projection 18 and a pair of auxiliary annular projections 20a and 20b, where each of the annular projections 18, 20a and 20b are spaced axially from each other. As can be seen, the clamping component 44 is compressed over the flexible hose 42 such that the flexible hose 42 is sandwiched between the clamping component 44 and the rigid tube 12 thereby forming a fluid-tight seal between the rigid tube 12 and the flexible hose 42.

The above-described duct structure 10 can provide a fluid tight connection between the flexible hose 42 and the endform 16. The use of the stop bead 40 can provide a positive stop for the clamping component 44 as it is positioned over the endform 16 (FIG. 1) and can provide a robust configuration that reduces material property variation which can reduce material scrap. In addition to the seals created around the auxiliary annular projections 20, a seal may be created between the flexible hose 42 and the trailing edge 28 of the primary annular projection 18 once the clamping component 44 is compressed as shown by FIG. 2. When the seals are created by the primary annular projection 18 and the one or more auxiliary annular projections 20, sealing is provided that is needed for high pressure power steering applications.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hydraulic duct for feeding fluid at high pressure, the hydraulic duct comprising:
    a rigid tube; and
    a flexible hose connected to the rigid tube by a connecting assembly, the connecting assembly comprising:
        an endform in communication with the rigid tube over which the flexible hose extends, the endform including a primary annular projection extending outwardly from a periphery of the endform and at least one auxiliary annular projection extending outwardly from the periphery of the endform, the primary annular projection including a leading edge, a trailing edge, a substantially flat landing region that is positioned outwardly distal in a radial direction from a substantially straight portion of the trailing edge and that extends axially between the leading edge and the trailing edge, and a stop bead that extends outwardly from the leading edge beyond the landing region; and
        a clamping component compressed over the flexible hose, the clamping component including a shell portion that extends in a direction generally along a length of the endform and a base portion extending inwardly from the shell portion toward the endform, wherein the clamping component terminates inwardly distal from the shell portion at an inner rim having an end face that is engaged with the landing region of the primary annular projection at a location adjacent the stop bead;
        wherein the clamping component has a wall thickness at the inner rim seated against the landing region that is less than a length of the landing region such that a trailing edge of the inner rim is spaced axially from the trailing edge of the primary annular projection, such that the flexible hose terminates at a termination location on the landing region that is axially positioned between the inner rim and the trailing edge of the primary annular projection.

2. The hydraulic duct of claim 1, wherein no portion of the flexible hose is located between the inner rim and the landing region.

3. The hydraulic duct of claim 1, wherein the trailing edge of the primary annular projection comprises a curved inner diameter portion, a substantially straight portion and a curved outer diameter portion.

4. The hydraulic duct of claim 1, wherein the leading edge extends outwardly at an angle from the periphery of the endform.

5. The hydraulic duct of claim 1 comprising a pair of auxiliary annular projections.

6. The hydraulic duct of claim 1, wherein the landing region is spaced radially outwardly from the periphery of the endform.

\* \* \* \* \*